US009213942B2

(12) United States Patent
Proctor et al.

(10) Patent No.: US 9,213,942 B2
(45) Date of Patent: Dec. 15, 2015

(54) PATTERN BEHAVIOR SUPPORT IN A RULE ENGINE

(75) Inventors: Mark Proctor, London (GB); Edson Tirelli, Montreal (CA)

(73) Assignee: Red Hat, Inc., Raleigh, NC (US)

( * ) Notice: Subject to any disclaimer, the term of this patent is extended or adjusted under 35 U.S.C. 154(b) by 818 days.

(21) Appl. No.: 12/540,289

(22) Filed: Aug. 12, 2009

(65) Prior Publication Data

US 2011/0040709 A1 Feb. 17, 2011

(51) Int. Cl.
*G06N 5/02* (2006.01)
*G06N 5/04* (2006.01)

(52) U.S. Cl.
CPC . *G06N 5/047* (2013.01); *G06N 5/02* (2013.01)

(58) Field of Classification Search
CPC ............................ G06F 17/30517; G06N 5/02
USPC ............................................................ 706/45
See application file for complete search history.

(56) References Cited

PUBLICATIONS

M. Nguyen et al., "Sense & Responsive Service Architecture (SARESA): An Approach towards a Real-time Business Intelligence Solution and its use for a Fraud Detection Application", ACM DOLAP'05, Nov. 4-5, 2005, pp. 77-86.*

R. Doorenbos, "Production Matching for Large Learning Systems", Ph.D Thesis, Carnegie Mellon University, Computer Science Dept., Jan. 31, 1995, pp. 1-208.*

J. Kramer and B. Seeger; "Semantics and implementation of continuous sliding window queries over data streams", ACM Transactions on Database Systems, vol. 34, No. 1, Apr. 2009.*

M. Cherniack et al., "Scalable Distributed Stream Processing", Proc. 2003 CIDR Conf., ACM, pp. 1-12.*

Groch, M., "Windows Support in the Rete Algorithm: A First Step Towards CEP with Rule-based Systems", Dresden University of Technology, Diploma Thesis, May 26, 2008, 98 pages.

Chandrasekaran, S., et al., "Streaming Queries over Streaming Data", Proceedings of the 28th VLDB Conference, Hong Kong, China, 2002, 12 pages.

Li, J., et al., "No Pane, No Gain: Efficient Evaluation of Sliding-Window Aggregates over Data Streams", SIGMOD Record, vol. 34, No. 1, Mar. 2005, pp. 39-44.

Ghanem, T., et al., "Incremental Evaluation of Sliding-Window Queries over Data Streams", 35 pages, Knowledge and Data Engineering, IEEE Trans. on, Jan. 2007.

* cited by examiner

*Primary Examiner* — Kakali Chaki
*Assistant Examiner* — Vincent Gonzales
(74) *Attorney, Agent, or Firm* — Lowenstein Sandler LLP

(57) ABSTRACT

Some embodiments of pattern behavior support in a rule engine have been presented. In one embodiment, a behavior builder registry is stored on a computer-readable storage device in a server. The behavior builder registry includes a set of behaviors supported by a rule engine and a set of builders associated with the behaviors. A compiler running on the server may compile a set of rules using the behavior builder registry to generate a network having a set of nodes. In response to a data object asserted propagating into a node of the network, the rule engine may first check one or more behaviors at the node before applying one or more regular constraints at the node on the data object asserted.

21 Claims, 7 Drawing Sheets

PATTERN BEHAVIOR SUPPORT IN A RULE ENGINE

TECHNICAL FIELD

Embodiments of the present invention relate to artificial intelligence, and more specifically to rule engines.

BACKGROUND

The development and application of rule engines is one branch of Artificial Intelligence (A.I.), which is a very broad research area that focuses on "making computers think like people." Broadly speaking, a rule engine is a set of one or more software modules running on a computing device (e.g., a server, a personal computer, etc.) that processes information by applying rules to data objects (such as facts). A rule is a logical construct for describing the operations, definitions, conditions, and/or constraints that apply to some predetermined data to achieve a goal. Various types of rule engines have been developed to evaluate and process rules. Conventionally, a rule engine creates a rulebase containing a network (e.g., Rete network) to process rules and data objects. The network may include many different types of nodes, including, for example, root nodes, object-type nodes, alpha nodes, left-input-adapter nodes, beta nodes (e.g., eval nodes, join nodes, not nodes, etc.), and terminal nodes, etc.

Typically, facts enter a network at a root node, from which they are propagated to any matching object-type nodes. From an object-type node, a data object is propagated to either an alpha node (if there is a literal constraint), a left-input-adapter node (if the data object is the left most object type for the rule), or a beta node (such as a join node).

Note that traditional applications using rule engines work by gathering all the facts regarding a given problem or scenario, inserting them into a working memory of the rule engine, executing the rules, obtaining the results, and starting the processing of the next work item. However, as more and more applications in today's business world demand the capability of event processing, where events represent state changes, typically have temporal relationship between them, and are generated in continuous streams, the conventional rule engines discussed above are inadequate to meet the demands of these applications. Furthermore, a common requirement of event processing is the ability to define and apply constraints that narrow the matching space to which regular constraints are applied. However, conventional rule engines typically lack the capability to define and apply such constraints prior to applying regular constraints.

BRIEF DESCRIPTION OF THE DRAWINGS

The present invention is illustrated by way of example, and not by way of limitation, in the figures of the accompanying drawings and in which.

DETAILED DESCRIPTION

Figures 1A, 1B:
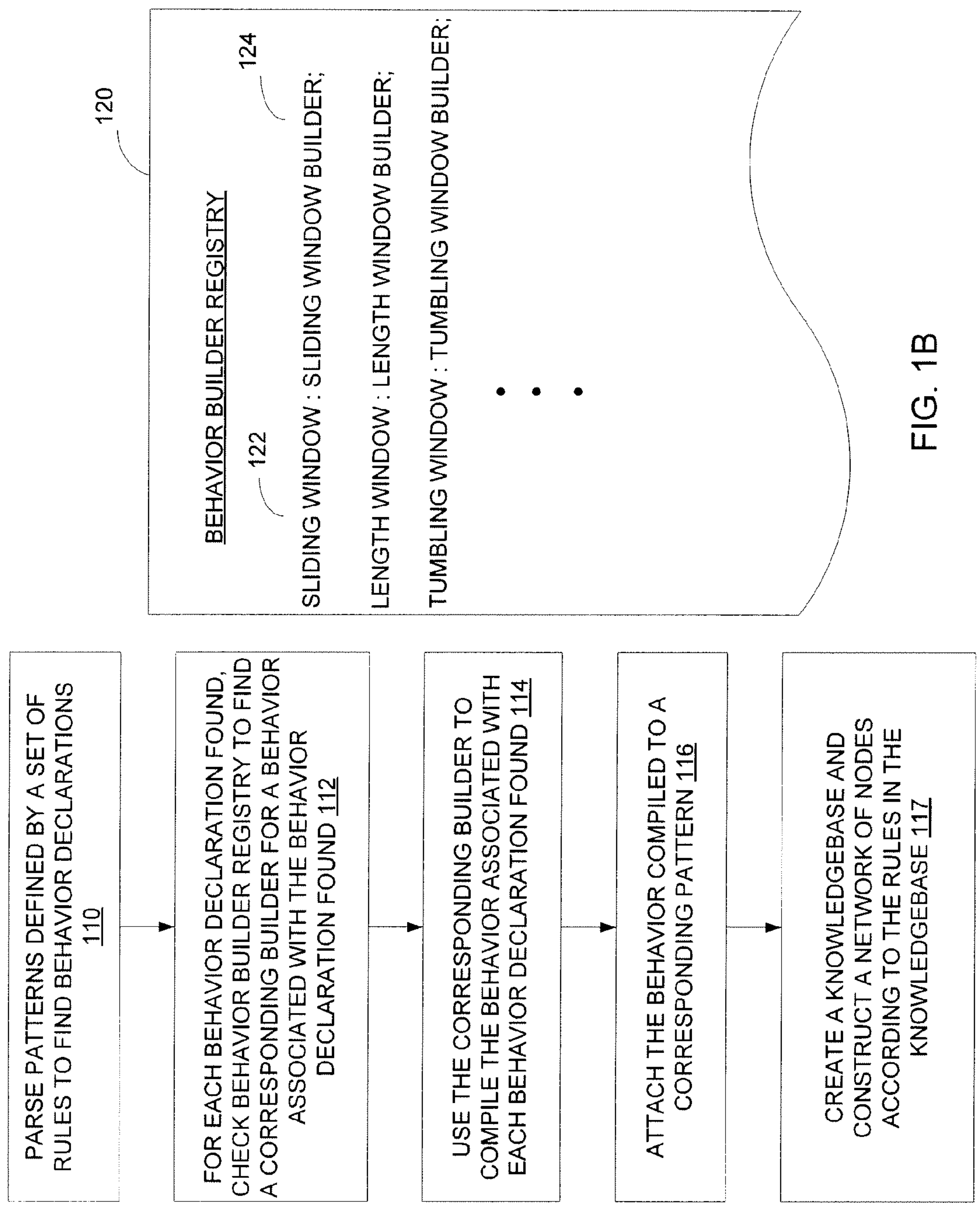
FIG. 1A illustrates one embodiment of a method to compile rules and behaviors.
FIG. 1B illustrates one embodiment of a behavior builder registry.

Described herein are some embodiments of a rule engine with pattern behavior support. Pattern behavior support is useful in event processing. In one embodiment, a behavior builder registry is stored on a computer-readable storage device in a server. The behavior builder registry includes a set of behaviors supported by a rule engine and a set of builders associated with the behaviors. A compiler compiles a set of rules using the behavior builder registry to generate a network of nodes. In response to a fact asserted into a node of the network, the rule engine may first check one or more behaviors at the node before applying one or more regular constraints at the node on the fact asserted. The regular constraints generally refer to constraints imposed by one or more of the set of rules other than the behaviors that modify patterns of the rules. Because the rule engine according to some embodiments of the invention processes rules and events in the same rulebase, the rulebase is hereinafter referred to as a "knowledgebase" instead to distinguish it from rulebases created by conventional rule engines. Likewise, a rule session of the rule engine according to some embodiments of the invention is referred to as a knowledge session hereinafter. More details of some embodiments of the rule engine are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates one embodiment of a method to compile rules and behaviors. The process may be performed by processing logic that may comprise hardware (e.g., circuitry, dedicated logic, programmable logic, microcode, etc.), software (such as instructions run on a processing device), firmware, or a combination thereof. For example, the compiler 510 in FIG. 5 may perform at least part of the process in some embodiments.

Referring to FIG. 1A, processing logic parses patterns defined by a set of rules to find behavior declarations (processing block 110). A behavior in the context of rule engines broadly refers to a modifier to a pattern defined by one or more rules. Thus, a behavior may also be referred to as a pattern behavior herein. Some examples of a behavior include a time-based sliding window, a length sliding window, a tumbling window, etc. Details of time-based sliding windows are further discussed below to illustrate some of the concepts disclosed herein. A behavior declaration as used herein is a declaration of a certain behavior according to syntax of the rule language in which the rules are written. Note the techniques disclosed herein are applicable to various types of rule languages, such as Drools Rule Language (DRL).

For each behavior declaration found, processing logic checks a behavior builder registry to find a corresponding builder for a behavior associated with the respective behavior declaration (processing block 112). FIG. 1B illustrates one embodiment of a behavior builder registry 120. The behavior builder registry 120 includes a set of behaviors 122 supported by a rule engine and a set of builders 124 associated with the set of behaviors 122. In addition to, or in alternative to, the names of the behaviors 122 and builders 124, addresses and/or pointers associated with the behaviors 122 and builders 124 may be stored in the behavior builder registry 120. In some embodiments, the behavior builder registry 120 is stored in a computer-readable storage device, such as a hard drive, a flash memory card, etc., which may be internal to or external to a server on which the rule engine runs.

After finding the appropriate builder for the respective behavior, processing logic uses the builder found to compile the respective behavior (processing block 114). Then processing logic attaches the behavior compiled to the corresponding pattern (processing block 116). Next, processing logic creates a knowledgebase and constructs a network of nodes according to the rules in the knowledgebase (processing block 117). As a result, a beta node in a network constructed according to the rules includes a list of beta constraints, as well as a list of behaviors. So, at build time, each beta node is associated with the behaviors corresponding to the pattern being joined from the right of the beta node. After compiling the rules and behaviors to generate the knowledgebase, the rule engine can process facts against the knowledgebase.

Figure 2:
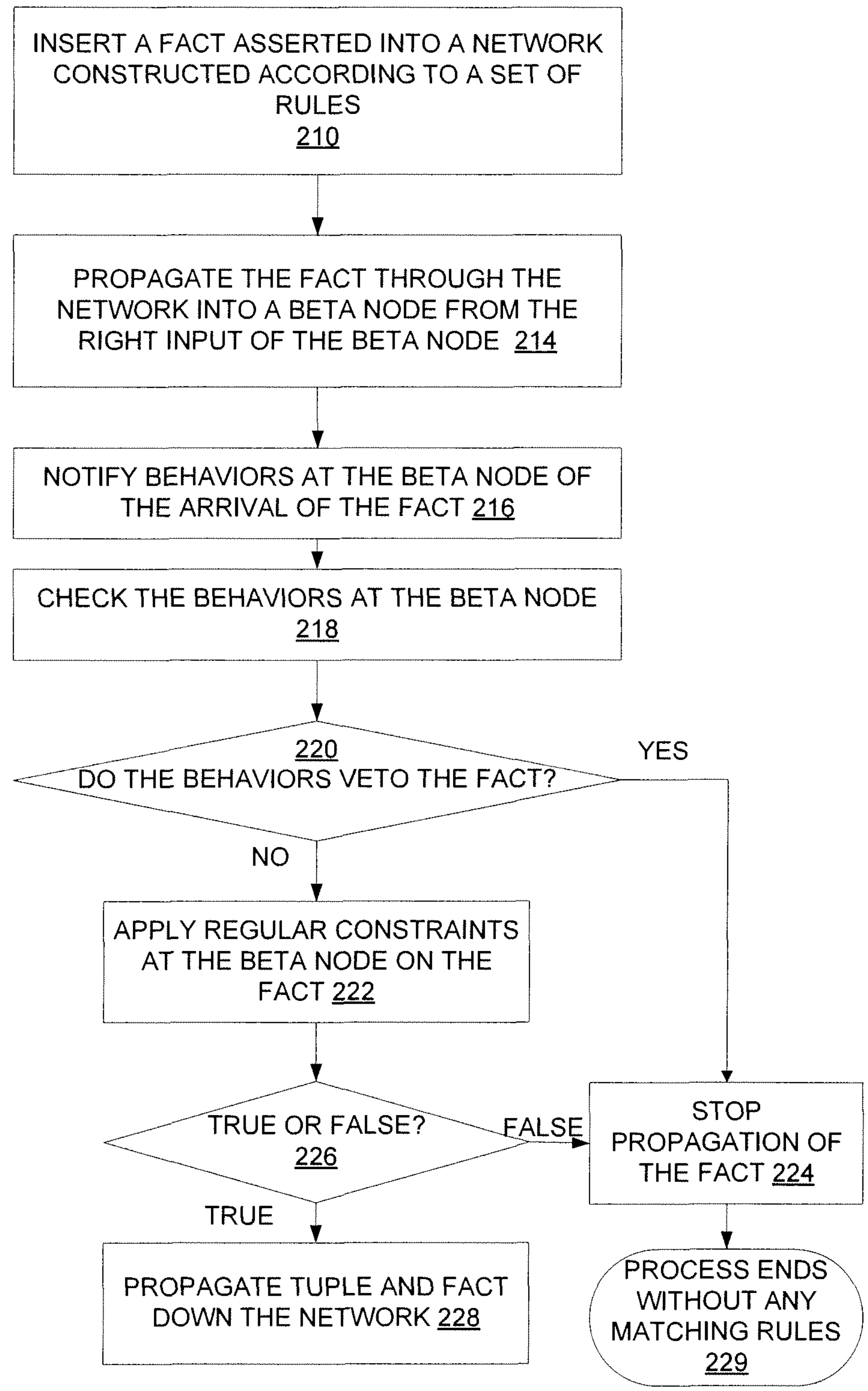
FIG. 2 illustrates one embodiment of a method to process facts asserted using a rule engine with behavior support.

FIG. 2 illustrates one embodiment of a method to process facts asserted using a rule engine with behavior support. The process may be performed by processing logic that may comprise hardware (e.g., circuitry, dedicated logic, programmable logic, microcode, etc.), software (such as instructions run on a processing device), firmware, or a combination thereof. For example, the rule engine 530 in FIG. 5 may perform at least part of the process in some embodiments.

Referring to FIG. 2, processing logic inserts a fact, which is asserted into a working memory (a.k.a. a knowledge session) of the rule engine, into a network constructed according to a set of rules (processing block 210). Generally speaking, a rule engine is a set of one or more processing modules, which receives facts asserted by users and rules, evaluate the facts against the rules, and may perform certain actions (or cause certain actions to be performed) based on the result of the evaluation. One embodiment of a rule engine according to the present invention is shown in details in FIG. 5. Generally speaking, a rule is a logical construct for describing the operations, definitions, conditions, and/or constraints that apply to some predetermined data to achieve a goal. For example, a business rule might state that no credit check is to be performed on return customers. Facts as used herein is one example of data objects processed by rule engines. The techniques disclosed herein are generally applicable to other types of data objects too, such as events.

As previously mentioned, conventional rule engines do not support events. An event as used herein broadly refers to a record of a significant change of state in an application domain. For instance, for one exemplary stock broker application, when a sell operation is executed, it causes a change of state in the domain. This change of state can be observed on several entities in the domain, like the price of the securities that has changed to match the value of the operation, the owner of the individual traded assets that change from the seller to the buyer, the balance of the accounts from both seller and buyer that are credited and debited, etc. Depending on how the domain is modelled, this change of state may be represented by a single event, multiple atomic events, or even hierarchies of correlated events. In some embodiments, an event may be viewed as a special type of facts by the rule engine. Thus, facts supported by conventional rule engines may be referred to as regular facts hereinafter. A stream of events generally refers to a series of at least two events occurring at different times. A common requirement of rule engines that support event processing is the ability to define and apply constraints that narrow the match space to which regular constraints are applied. Such constraints are examples of pattern behaviors in the context of rule engines. One of the most common types of pattern behaviors are sliding windows, which are further discussed in details below with reference to FIGS. 4A and 4B.

Referring back to FIG. 2, processing logic propagates the fact through the network into a beta node of the network from the right input of the beta node (processing block 214). A beta node has two inputs, unlike one-input nodes, such as object-type nodes and alpha nodes. A beta node can receive tuples in its left-input and data objects, or simply referred to as objects, in its right-input. Join node, not node, collect node, accumulate node, eval node, and exist node are some examples of beta nodes. All nodes may have one or more memories to store a reference to the data objects and tuples propagated to them, if any. In some embodiments, a left-input-adapter node creates a tuple with a single data object and propagates the tuple created to the left-input of the first beta node connected to the left-input-adapter node, where the tuple is placed in the left-input memory of the beta node and then join attempts are made with all the objects in the right memory of the beta node.

When another data object enters the right-input of the join node, the data object is placed in the right memory of the join node and join attempts are made with all the tuples (including the tuple) in the left memory of the join node. The tuples placed in the left memory of the join node are partially matched. If a join attempt is successful, the data object is added to the tuple and is then propagated to the left-input of the next node in the network. Such evaluation and propagation continue with other nodes down the network, if any, until the tuple reaches the terminal node. When the tuple reaches the terminal node, the tuple is fully matched. At the terminal node, an activation is created from the fully matched tuple and the corresponding rule. The activation is placed onto an agenda of the rule engine for potential firing or potential execution.

To support behaviors, processing logic performs the following operations when the fact arrives at the beta node. Referring to FIG. 2, processing logic notifies behaviors at the beta node of the arrival of the fact (processing block 216). Processing logic first checks the behaviors at the beta node (processing block 218) and determines if the behaviors veto the fact (processing block 220). The behaviors veto the fact if the fact does not meet one or more of the constraints imposed by the behaviors (hereinafter, the behavioral constraints, as opposed to regular constraints imposed by the rules at the beta node). For example, if one of the behaviors is a time-based sliding window imposing a behavioral constraint of the last ten (10) minutes with respect to the current time (i.e., a 10-minute window) and the event (fact) occurred within the last 10 minutes, then the event is not vetoed. However, if the event has occurred over 10 minutes ago, then it is vetoed because the fact is outside of the 10-minute window. More details of some examples of sliding windows are discussed below.

If the behaviors veto the fact, then processing logic stops propagation of the fact (processing block 224) and the process ends without any matching rules resulted from the fact (processing block 229). Otherwise, if the behaviors do not veto the fact, then processing logic apply regular constraints of the beta node on the fact (processing block 222). Then processing logic determines if the result of applying the regular constraints on the fact is true or false (processing block 226). If it is true, then processing logic propagates a tuple of the beta node and the fact down the network (processing block 228). Otherwise, if the result is false, then processing logic stops propagation of the fact (processing block 224) and the process ends without any matching rules resulted from the fact (processing block 229).

Figure 3:
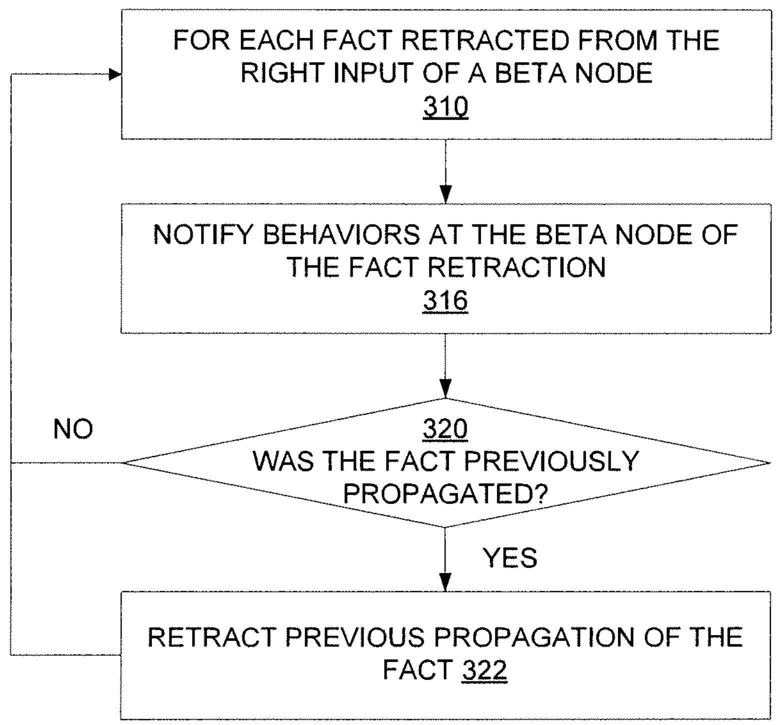
FIG. 3 shows one embodiment of a method to process facts retracted using a rule engine with behavior support.

FIG. 3 shows one embodiment of a method to process facts retracted using a rule engine with behavior support. The process may be performed by processing logic that may comprise hardware (e.g., circuitry, dedicated logic, programmable logic, microcode, etc.), software (such as instructions run on a processing device), firmware, or a combination thereof. For example, the rule engine 530 in FIG. 5 may perform at least part of the process in some embodiments.

Facts that have arrived or have propagated through a beta node in a network constructed according to rules can be retracted. For each fact retracted from the right input of the beta node, processing logic notifies behaviors at the beta node of the fact retraction (processing block 316). Processing logic further checks if the fact has previously been propagated through the beta node (processing block 320). If the fact has previously been propagated, then processing logic retracts previous propagation of the fact (processing block 322) and returns to processing block 310 to repeat the above operations on other facts retracted. Otherwise, if the fact has not previously been propagated, then processing logic returns to processing block 310 to repeat the above operations on other facts retracted.

As mentioned above, a common requirement to event processing in rule engines is the ability to define and apply constraints that narrow the match space to which regular constraints are applied. One of the common types of such constraints is a sliding window. A sliding window constraint defines a window of interest over events. This window moves or slides over time, with new events arriving into the window and older events leaving the window. Thus, this type of sliding windows may also be referred to as time-based sliding windows. For instance, consider the following pattern: StockTick (symbol=="RHT"). It would match all StockTick events whose symbol is "RHT", and it does not matter how long ago these events happened. If one is interested, though, only on the events that happened in the last hour and thirty (30) minutes (i.e., a 1 h 30 m window), then the following rule can be used:

StockTick(symbol=="RHT") over window:time(1 h 30 m)

Note that the concept of "last" is relative to the current instant in the timeline. Since time is expected to always move forward, the window of 1 h 30 m also moves, with new events arriving into the window and events older than that leaving the window and never matching again.

Figure 4A:
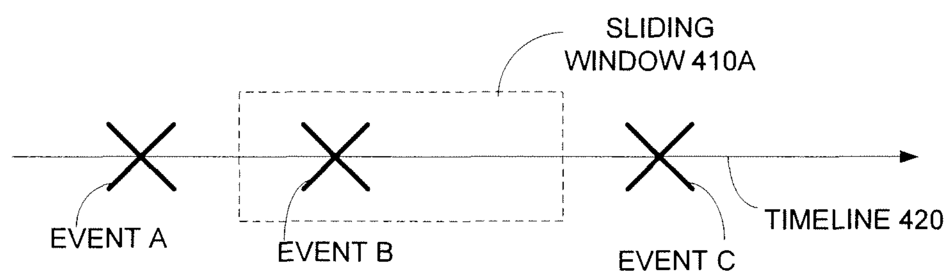
FIGS. 4A and 4B illustrate one embodiment of a time-based sliding window.
Figure 4B:
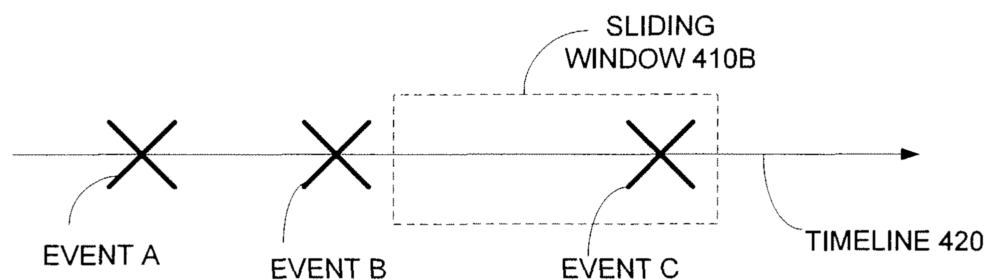

FIGS. 4A and 4B illustrate one embodiment of a time-based sliding window. Events A, B, and C happen sequentially along timeline 420. In FIG. 4A, event B falls within the sliding window 410A. Event A has happened earlier than the sliding window 410A and falls outside of the sliding window 410A. Note that as time always moves forward, event A may never match again. Event C is occurring later than the time period currently covered by the sliding window 410A and also falls outside of the sliding window 410A. But event C may be matched later in time. FIG. 4B shows the same timeline 420 later in time than FIG. 4A. The sliding window 410B has moved forward along the timeline 420 in FIG. 4B such that event B has fallen outside of the sliding window 410B. As a result, event B may never match again. Instead, event C now falls within the sliding window 410B, and thus, event C may be matched.

In some embodiments, the current instant is defined by a central clock called SessionClock. It always moves forward, but it may be one of several types, including a real time clock and a pseudo clock (meaning a clock controlled by an application).

Another type of sliding windows is called length window, which is defined as the "last X events," Where X is an integer. For instance, consider the following pattern:

StockTick(symbol=="RHT") over window:length(10)

The above pattern may match all the latest ten (10) StockTick events whose symbol is "RHT." In this case, there is no concept of clock, but there is still time involved, since the window is defined by the last 10 events in the order of time.

In some embodiments, there are other types of windows, such as tumbling windows, combinations of windows, and special behaviors for patterns, like unique, grouping, etc. Note that these behaviors are some types of modifiers to patterns in the context of rule engines. In general, these behaviors can be implemented using a general framework having a compile time support and a runtime support. Details of compile time support have been discussed above with reference to FIGS. 1A and 1B, whereas details of runtime support have been discussed above with reference to FIGS. 2 and 3.

Figure 5:
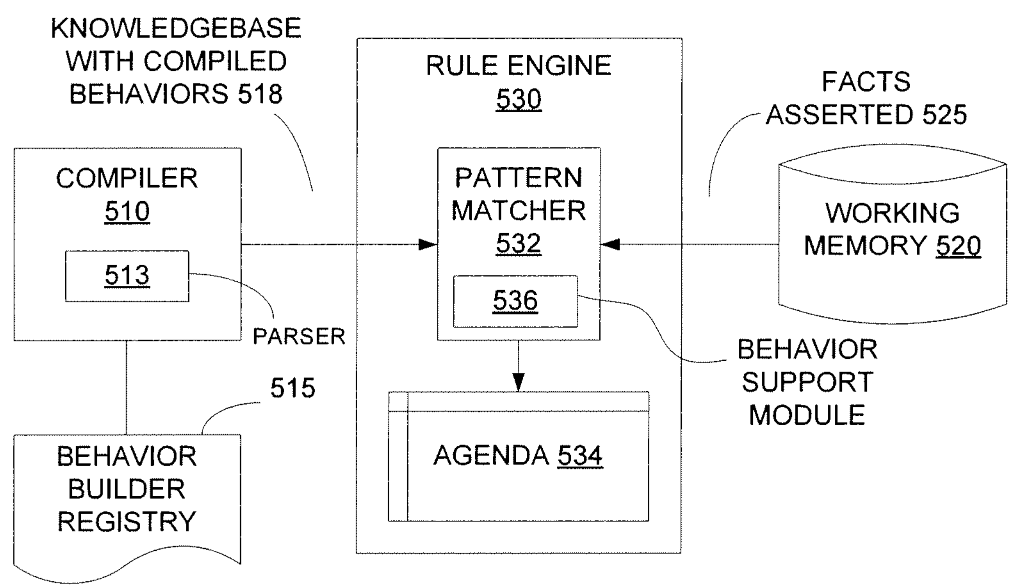
FIG. 5 shows one embodiment of a rule engine usable with some embodiments of the present invention.

FIG. 5 shows one embodiment of a rule engine with pattern behavior support. In some embodiments, a rule engine 530 is operatively coupled to a compiler 510 and a working memory 520. The compiler 510 has a parser 513 to parse patterns defined by a set of rules, and the compiler 510 builds behaviors using their corresponding builders found using the behavior builder registry 515. The compiler 510 then attaches the behaviors built to their corresponding patterns to generate a knowledgebase 518 with compiled behaviors. The working memory 520 stores data objects (e.g., regular facts and events) that have been asserted. Details of some embodiments of the behavior builder registry 515 and how to compile behaviors have been discussed above.

In some embodiments, the rule engine 530 includes a pattern matcher 532 and an agenda 534. The pattern matcher 532 may evaluate the knowledgebase 518 from the compiler 510 against the data objects asserted 525 from the working memory 520. The knowledgebase 518 typically includes a network constructed according to the rules. The network includes various types of nodes, such as a beta node. When a data object asserted propagates into a beta node, a behavior support module 536 within the pattern matcher 532 may first check one or more behaviors at the beta node before applying regular constraints at the beta node on the data objects asserted 525. Details of some examples of how behavior support affects data object assertion and data object retraction have been described above.

Fully matched rules result in activations, which are placed into the agenda 534. The rule engine 530 may iterate through the agenda 534 to execute or fire the activations sequentially. Alternatively, the rule engine 530 may execute or fire the activations in the agenda 534 randomly.

Figure 6A:
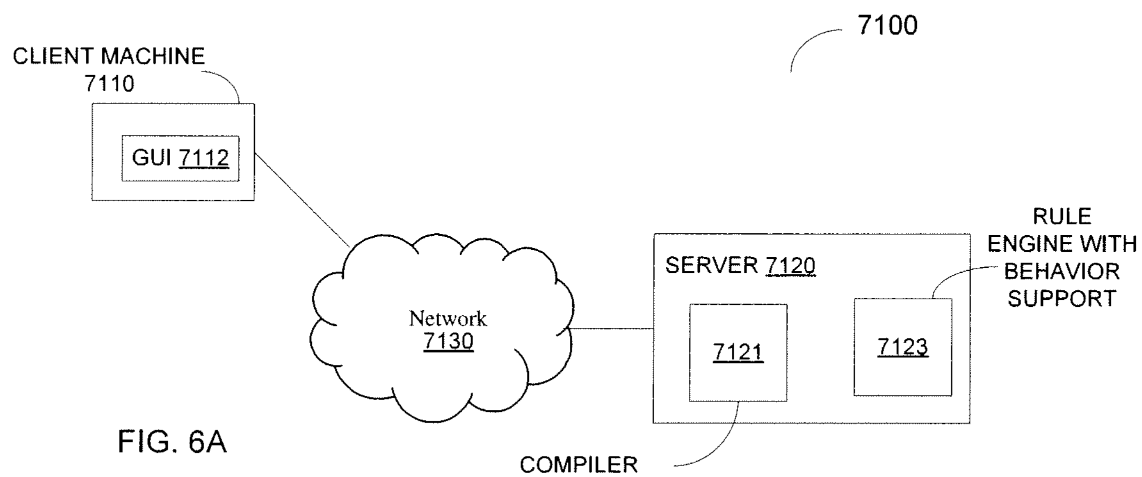
FIG. 6A shows one embodiment of a system usable with some embodiments of the present invention.

FIG. 6A illustrates one embodiment of a system usable with some embodiments of the present invention. The system 7100 includes a client machine 7110 and a server 7120, which are coupled to each other via a network 7130. The client machine 7110 may include a computing machine, such as a desktop personal computer (PC), a laptop PC, a personal digital assistant (PDA), a mobile telephone, etc. The network 7130 coupling the client machine 7110 to the server 7120 may include various kinds of networks, such as an intranet, the Internet, a local area network (LAN), etc. The server 7120 may be implemented using the computer system 700 as illustrated in FIG. 7.

In some embodiments, the server 7120 includes a compiler 7121 and a rule engine 7123 having the architecture as illustrated in FIG. 5. The client machine 7110 may present a graphical user interface (GUI) 7112 (e.g., a webpage rendered by a browser) to allow users to input rule sets, events, and/or facts, etc., which may be sent to the server 7120 to be processed using the compiler 7121 and the rule engine 7123 as discussed above.

Figure 6B:
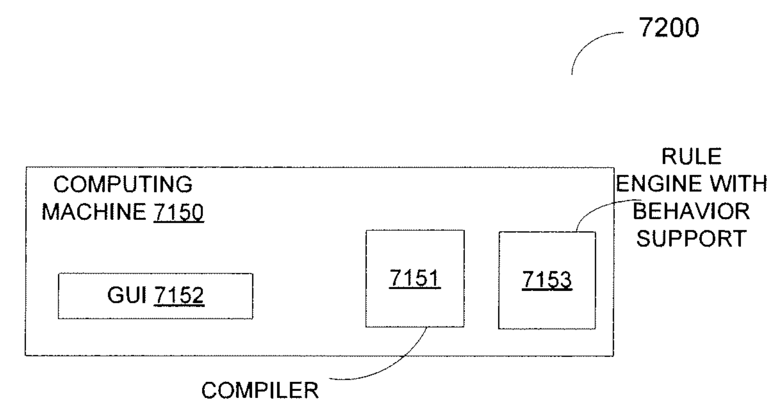
FIG. 6B shows an alternate embodiment of a system usable with some embodiments of the present invention.

FIG. 6B illustrates an alternate embodiment of a system usable with some embodiments of the present invention. The system 7200 includes a computing machine 7150, which may be implemented using the computer system 700 illustrated in FIG. 7. The computing machine 7150 includes a compiler 7151, a rule engine 7153, and a GUI 7152. Some embodiments of the compiler 7151 and the rule engine 7153 have been discussed above with reference to FIG. 5. In some embodiments, users may input files of rules and/or data objects using the GUI 7152. Then the files may be processed by the compiler 7151 and the rule engine 7153 as discussed above.

Figure 7:
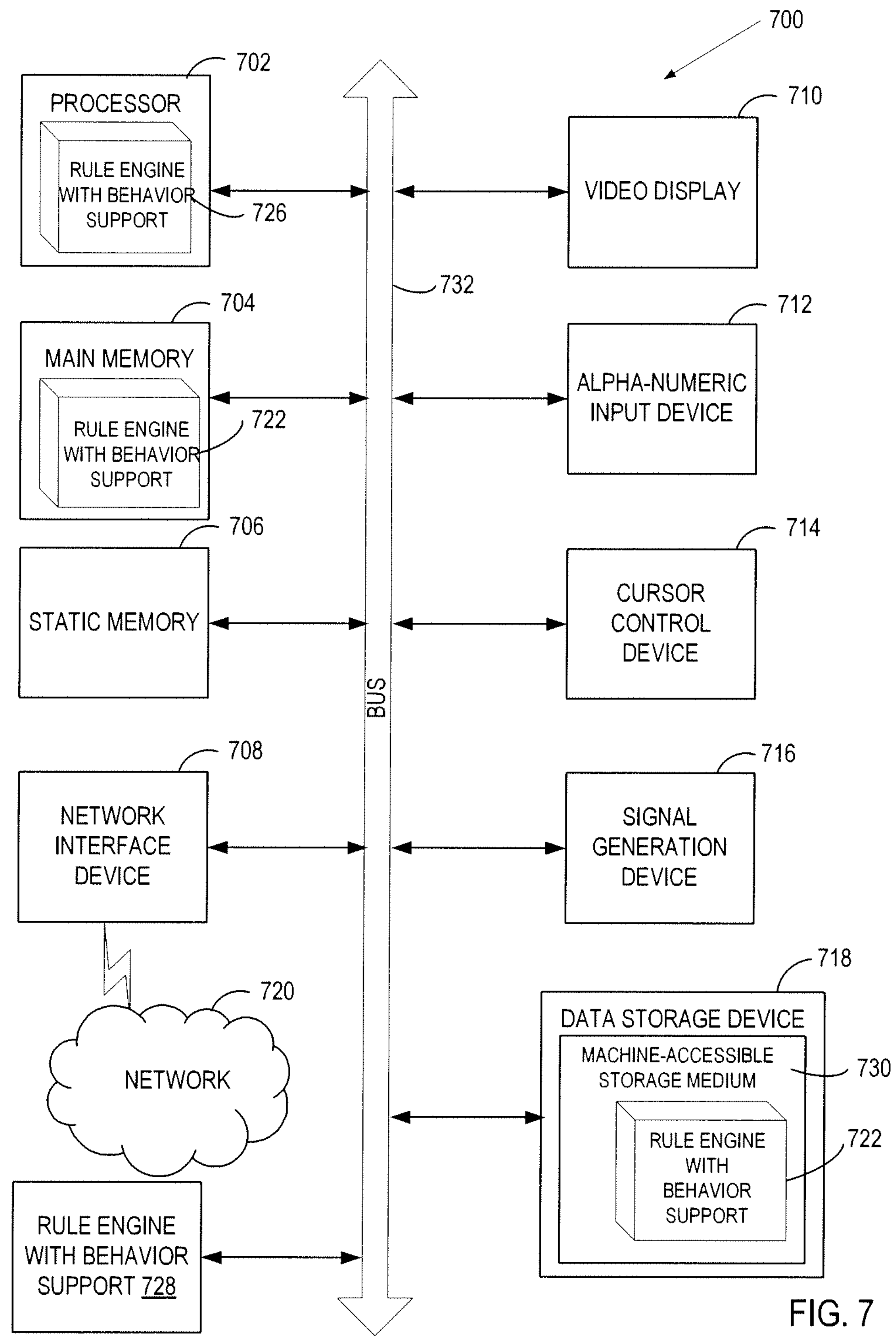
FIG. 7 illustrates a block diagram of an exemplary computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a laptop PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a data storage device 718, which communicate with each other via a bus 732.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute rule engine with behavior support 726 for performing the operations discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 (also known as a computer-readable storage medium) on which is stored one or more sets of instructions (e.g., rule engine with behavior support 722) embodying any one or more of the methodologies or functions described herein. The rule engine with behavior support 722 may also reside, completely or at least partially, within the main memory 704 and/or within the processing device 702 during execution thereof by the computer system 700, the main memory 704 and the processing device 702 also constituting machine-accessible storage media. The rule engine with behavior support 722 may further be transmitted or received over a network 720 via the network interface device 708.

While the machine-accessible storage medium 730 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The module, rule engine with behavior support 728, components and other features described herein (for example, in relation to FIG. 5) can be implemented as discrete hardware components or integrated into the functionalities of hardware components, such as ASICS, FPGAs, DSPs, or similar devices. In addition, the rule engine with behavior support 728 can be implemented as firmware or functional circuitries within hardware devices. Further, the rule engine with behavior support 728 can be implemented in any combination of hardware devices and software components.

Thus, some embodiments of pattern behavior support in a rule engine have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

storing a behavior builder registry on a computer-readable storage device operatively coupled to a processor, the behavior builder registry comprising a plurality of behaviors constraints supported by a rule engine and a plurality of builders associated with the plurality of behaviors constraints;

compiling, by the processor, a plurality of rules using the behavior builder registry to generate a network comprising a plurality of nodes;

parsing patterns defined by the plurality of rules to identify a set of behavior constraints, wherein each behavior constraint comprise a power to veto a data object;

associating one of the plurality of builders with each of the set of behavior constraints according to the behavior builder registry;

propagating a first data object into a first node of the network, wherein the first beta node is associated with a first behavioral constraint; and checking, by the processor, the first behavioral constraint at the first node to determine whether to veto the first data object before applying a regular constraint at the first node on the first data object, wherein the first data object is not propagated by the first node if the behavioral constraint vetoes the first data object.

2. The method of claim 1, further comprising:

applying, by the processor, the regular constraint on the first data object asserted at the first node if the first behavioral constraint does not veto the first data object.

3. The method of claim 1, further comprising:

notifying, by the processor, the first behavioral constraint at the first node of a second data object being retracted; and retracting, by the processor, a previous propagation of the second data object if the second data object has been propagated forward from the first node to another node in the network.

4. The method of claim 1, wherein compiling a plurality of rules to generate a network comprising the plurality of nodes further comprises attaching each of the plurality of behavior constraints compiled to a corresponding pattern.

5. The method of claim 1, wherein the first behavior constraint comprises at least one of a time-based sliding window, a length window, or a tumbling window.

6. The method of claim 1, wherein the first behavioral constraint at the first node corresponds to a pattern being joined from a right side of the first node.

7. The method of claim 1, wherein the first data object comprises an event.

8. An apparatus comprising:

a computer-readable storage device to store a behavior builder registry, the behavior builder registry comprising a plurality of behaviors constraints supported by a rule engine and a plurality of builders associated with the plurality of behaviors constraints; and a processor operatively coupled to the computer-readable storage device, the processor to:

compile a plurality of rules using the behavior builder registry to generate a network comprising a plurality of nodes, parsing patterns defined by the plurality of rules to find a set of behavior constraints, wherein each behavior constraint comprise a power to veto a data object, associate one of the plurality of builders with each of the set of behavior constraints according to the behavior builder registry, and propagate a first data object into a first node of the network, wherein the first node is associated with a first behavioral constraint, check the first behavioral constraint at the first node to determine whether to veto the first data object before applying a regular constraint at the first node on the first data object, wherein the first data object is not propagated by the first node if the first behavioral constraint vetoes the first data object.

9. The apparatus of claim 8, the processor to apply the regular constraint on the first data object asserted at the first node if the first behavioral constraint does not veto the first data object.

10. The apparatus of claim 8, the processor to notify the first behavioral constraint at the first node of a second data object being retracted, and to retract previous propagations of the second data object if the second data object has been propagated forward from the first node to another node in the network.

11. The apparatus of claim 8, the processor to attach each of the plurality of behavior constraints compiled to a corresponding pattern.

12. The apparatus of claim 8, wherein the first behavioral constraint comprises at least one of a time-based sliding window, a length window, or a tumbling window.

13. The apparatus of claim 8, wherein the first node is a beta node, and the first behavioral constraint at the beta node corresponds to a pattern being joined from a right side of the beta node.

14. The apparatus of claim 8, wherein the first data object comprises an event.

15. A non-transitory computer-readable storage medium embodying instructions that, when executed by a processor, cause the processor to:

store a behavior builder registry on a computer-readable storage device operatively coupled to a processor, the behavior builder registry comprising a plurality of behaviors constraints supported by a rule engine and a plurality of builders associated with the plurality of behaviors constraints;

compile, by the processor, a plurality of rules using the behavior builder registry to generate a network comprising a plurality of nodes;

parse patterns defined by the plurality of rules to identify a set of behavior constraints, wherein each behavior constraint comprise a power to veto a data object;

associate one of the plurality of builders with each of the set of behavior constraints according to the behavior builder registry;

propagate a first data object into a first node of the network, wherein the first node is associated with a first behavioral constraint; and check, by the processor, the first behavioral constraint at the first node to determine whether to veto the first data object before applying a regular constraint at the first node on the first data object, wherein the first data object is not propagated by the first node if the behavioral constraint vetoes the first data object.

16. The non-transitory computer-readable storage medium of claim 15, the processor to:

apply, at the first node, the regular constraint on the first data object if the behavioral constraint does not veto the data object asserted.

17. The non-transitory computer-readable storage medium of claim 15, the processor to:

notifying the first behavioral constraint at the first node of a second data object being retracted; and retracting a previous propagation of the second data object if the second data object has been propagated forward from the first node to another node in the network.

18. The non-transitory computer-readable storage medium of claim 15, the processor to attach each of the plurality of behavior constraints compiled to a corresponding pattern.

19. The non-transitory computer-readable storage medium of claim 15, wherein the first behavioral constraint comprises at least one of a time-based sliding window, a length window, or a tumbling window.

20. The non-transitory computer-readable storage medium of claim 15, wherein the first behavioral constraint at the first node corresponds to a pattern being joined from a right side of the first node.

21. The non-transitory computer-readable storage medium of claim 15, wherein the first data object comprises an event.

* * * * *